(12) United States Patent
Shakoor et al.

(10) Patent No.: US 11,116,154 B2
(45) Date of Patent: Sep. 14, 2021

(54) INTEGRATED FIELD PHENOTYPING AND MANAGEMENT PLATFORM FOR CROP DEVELOPMENT AND PRECISION AGRICULTURE

(71) Applicant: DONALD DANFORTH PLANT SCIENCE CENTER, St. Louis, MO (US)

(72) Inventors: Nadia Shakoor, St. Louis, MO (US); Todd Mockler, St. Louis, MO (US); William Francis Kezele, St. Louis, MO (US)

(73) Assignee: Donald Danforth Plant Science Center, St. Louis, MO (US)

(*) Notice: Subject to any disclaimer, the term of this patent is extended or adjusted under 35 U.S.C. 154(b) by 284 days.

(21) Appl. No.: 16/328,565

(22) PCT Filed: Sep. 8, 2017

(86) PCT No.: PCT/US2017/050723
§ 371 (c)(1),
(2) Date: Feb. 26, 2019

(87) PCT Pub. No.: WO2018/049189
PCT Pub. Date: Mar. 15, 2018

(65) Prior Publication Data
US 2021/0045301 A1   Feb. 18, 2021

Related U.S. Application Data

(60) Provisional application No. 62/385,659, filed on Sep. 9, 2016.

(51) Int. Cl.
*A01G 25/16*   (2006.01)
*A01C 23/00*   (2006.01)
(Continued)

(52) U.S. Cl.
CPC .......... *A01G 25/167* (2013.01); *A01C 23/007* (2013.01); *G05B 19/042* (2013.01);
(Continued)

(58) Field of Classification Search
CPC .. A01G 25/167; A01C 23/007; G05B 19/042; G05B 2219/2625; H04N 5/2253; H04N 5/247
See application file for complete search history.

(56) References Cited

U.S. PATENT DOCUMENTS 3,994,514 A   11/1976  Zimmerer et al.
6,393,927 B1   5/2002  Biggs et al.
(Continued)

FOREIGN PATENT DOCUMENTS

CN   101413797 A   4/2009
CN   201803950 U   4/2011
(Continued)

OTHER PUBLICATIONS

Dong et al., "Autonomous Precision Agriculture through Integration of Wireless Underground Sensor Networks with Center Pivot Irrigation System", Ad Hoc Networks, 2013, pp. 1975-1987, vol. 11, No. 7.
(Continued)

*Primary Examiner* — Chad G Erdman
(74) *Attorney, Agent, or Firm* — Thompson Coburn LLP

(57) ABSTRACT

A field controller and sensor is presented as an elongate body having a hollow interior and axially opposite first and second ends with a first arm extending outward from the elongate body adjacent to the first axial end and a second arm extending outward from the elongate body adjacent to the second, axially opposite end. Each of the arms has an imaging device. The first arm imaging device is positioned to obtain images in a direction toward the second axial end
(Continued)

of the elongate body. The second arm imaging device is positioned to obtain images in a direction toward the first axial end. The first and second arms are spaced apart from one another along a length of the elongate body at a distance sufficient to image a canopy of crop growth in a field in which the field controller and sensor is deployed. The sensor may be formed from modules that allow the operator the ability to vary the height of the sensor by stacking the modules together end to end, which in turn allows users to scale their particular system with varying crop sizes within crop rotations.

21 Claims, 15 Drawing Sheets

(51) Int. Cl.
G05B 19/042 (2006.01)
H04N 5/225 (2006.01)
H04N 5/247 (2006.01)
(52) U.S. Cl.
CPC ........... H04N 5/2253 (2013.01); H04N 5/247 (2013.01); G05B 2219/2625 (2013.01)

(56) References Cited

U.S. PATENT DOCUMENTS

| 2008/0046130 | A1 | 2/2008 | Faivre et al. |
| 2009/0279741 | A1 | 11/2009 | Susca et al. |
| 2012/0113225 | A1 | 5/2012 | Deppermann et al. |
| 2013/0325242 | A1 | 12/2013 | Cavender-Bares et al. |
| 2015/0051779 | A1 | 2/2015 | Camacho-Cook et al. |
| 2015/0075299 | A1* | 3/2015 | Riess ............... G01N 1/405 73/863.21 |
| 2015/0142250 | A1 | 5/2015 | Cavender-Bares et al. |
| 2016/0205318 | A1 | 7/2016 | Wang et al. |

FOREIGN PATENT DOCUMENTS

| CN | 202486595 | U |   | 10/2012 |
| CN | 203687879 | U |   | 7/2014 |
| CN | 204347662 | U |   | 5/2015 |
| CN | 104798766 | A |   | 7/2015 |
| CN | 204514370 | U |   | 7/2015 |
| CN | 104914830A | A |   | 9/2015 |
| CN | 105547252 | A | * | 5/2016 |
| CN | 205283608 | U |   | 6/2016 |
| CN | 105785927 | A |   | 7/2016 |
| CN | 205375797 | U |   | 7/2016 |
| CN | 205378045 | U | * | 7/2016 |
| JP | 2015210124 | A |   | 11/2015 |
| JP | 2017023021 | A | * | 2/2017 |
| KR | 101531367 | B1 | * | 6/2015 |

OTHER PUBLICATIONS

El-Kader et al., "Precision Farming Solution in Egypt Using the Wireless Sensor Network Technology", Egyptian Informatics Journal, 2013, pp. 221-233, vol. 14, No. 3.

Gutierrez et al., "Automated Irrigation System Using a Wireless Sensor Network and GPRS Module", IEEE Transactions on Instrumentation and Measurement, 2014, pp. 166-176, vol. 63, No. 1.

Mafuta et al., "Successful Deployment of a Wireless Sensor Network for Precision Agriculture in Malawi", Networked Embedded Systems for Every Application (NESEA), 2012 IEEE 3rd International Conference.

Mendez et al., "A WiFi Based Smart Wireless Sensor Network for an Agricultural Environment", Fifth International Conference on Sensing Technology, 2011, pp. 405-410.

Rewald et al., "Minirhizotron Technique", Chapter 42. In: Eshel, A. & Beeckman Plant Roots: The hidden half, 4th Ed, 2013, 48 pages.

Sivasankari et al., "Wireless Sensor Based Crop Monitoring System for Agriculture Using Wi-Fi Network Dissertation", International Journal of Computer Science and Information Technoogy Research, 2014, pp. 293-303, vol. 2, No. 3.

White et al., "Field-Based Phenomics for Plant Genetics Research", Field Crops Research 133, 2012, pp. 101-112.

* cited by examiner

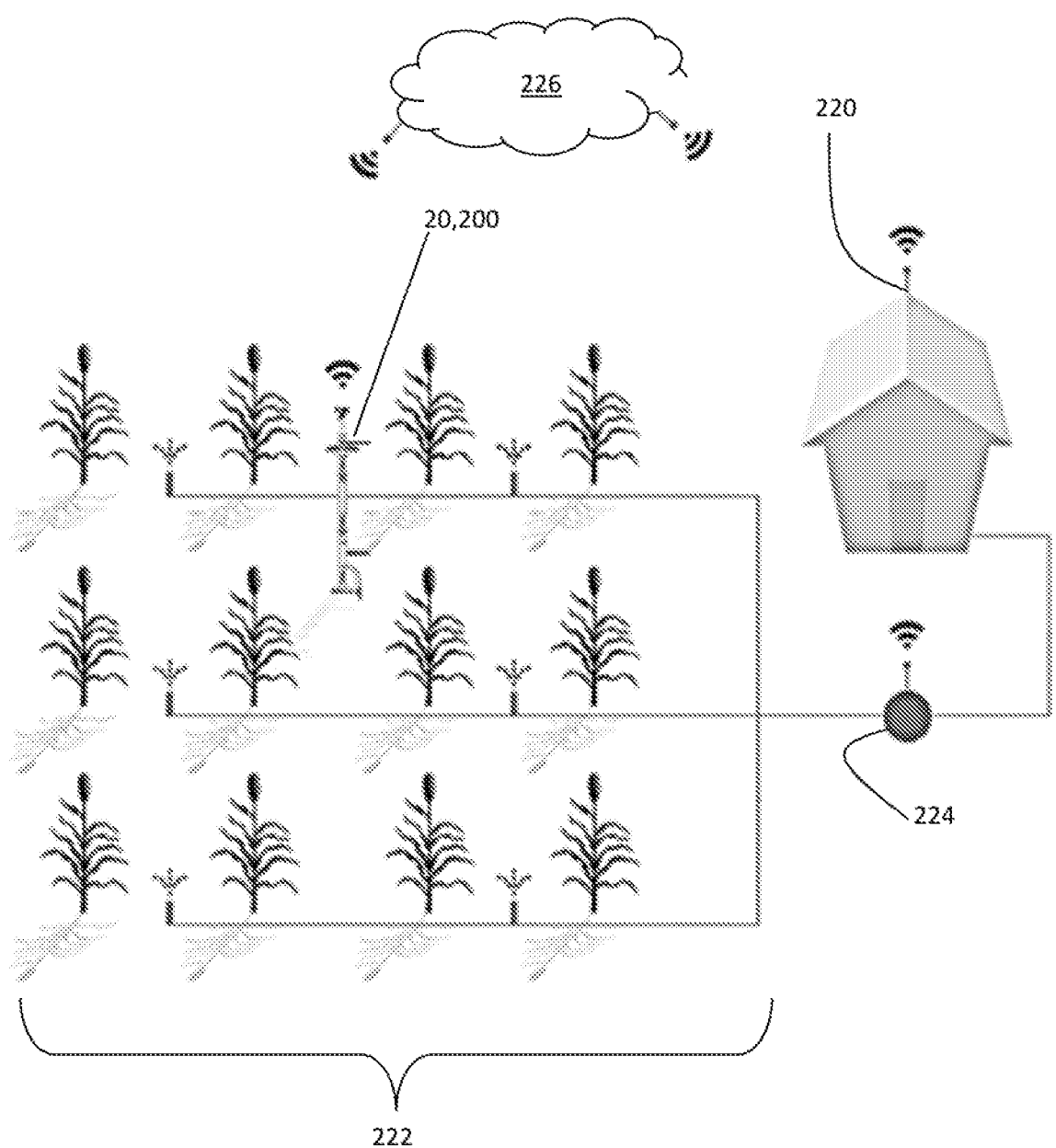
Fig. 13
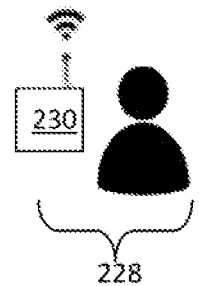

INTEGRATED FIELD PHENOTYPING AND MANAGEMENT PLATFORM FOR CROP DEVELOPMENT AND PRECISION AGRICULTURE

CROSS-REFERENCE TO RELATED APPLICATIONS

This patent application is a 35 U.S.C. § 371 National Phase Application of International Patent Application No. PCT/US2017/50723, filed Sep. 8, 2017, claiming the benefit of U.S. Provisional Patent Application Ser. No. 62/385,659, filed Sep. 9, 2016, which are incorporated herein by reference in their entireties.

STATEMENT REGARDING FEDERALLY SPONSORED RESEARCH OR DEVELOPMENT

This invention was made with government support under DE-AR0000594 awarded by Department of Energy. The government has certain rights in the invention.

BACKGROUND AND SUMMARY

Canopy architecture is a major target in crop breeding for improved yields and has particular significance for the production of bioenergy crops for renewable energy. Improving photosynthetic capacity is a key approach to enhancing crop productivity as canopy photosynthesis is closely related to crop yields. In particular, selection of cultivars with more erect leaves, especially at the top of the canopy, can lead to improved light environments inside a canopy and improved canopy photosynthetic $CO_2$ uptake.

The device and methods disclosed herein will allow crop scientists, farmers and agricultural companies to tackle the challenge of identifying the ideal canopy architectural and leaf metabolic features to breed or engineer crops for increased canopy photosynthesis in current and future variable environments and elevated $CO_2$ conditions, while simultaneously providing information for identifying energy efficient conditions for minimal water and electricity inputs.

The inventive device will allow agricultural industry scientists to monitor directly within the plant canopy, providing crucial information for studies on crop growth and development, hydrology, carbon and nutrient cycling, and climate change. Direct canopy measurements are particularly challenging and tedious to obtain due to inherent difficulties in taking direct measurements, high levels of temporal and spatial variation, and an inability to generalize local measurements to the landscape scale. An inexpensive, easily deployed sensor at the field plot level would be able to address these challenges.

The remote field controller and sensor and the associated methods disclosed herein allow for direct canopy measurements while simultaneously integrating auxiliary controllers interfaced with irrigation and fertilization equipment for energy-efficient precision agriculture and plant management applications. The remote field controller and sensor may reduce irrigation consumption and electricity requirements for bioenergy crop production.

The remote field controller and sensor may be configured as a "smart" sensor station that may be enabled to monitor and adjust field site conditions in real time for crops and other plants. Environmental and crop sensors on the remote field controller and sensor may be configured to take real-time measurements of temperature, humidity, $CO_2$, barometric pressure, light quantity and quality, wind speed and direction, rainfall, soil moisture, soil temperature, pH and nutrient composition. In addition to one or more of the aforementioned environmental and crop sensors, the remote field controller and sensor may be provided with cameras or other imaging devices that allow continuous calculation of leaf area indices, leaf angle distributions and canopy geometry/openness. In one embodiment, a modular minirhizotron system may be incorporated into the remote field controller and sensor to take images of crop roots below the soil, allowing observation of root growth and development in real time. The remote field controller and sensor may be powered by a solar panel with a backup battery and all sensor data may have the ability to be stored locally and/or transmitted via a hardwire connection or wirelessly, for instance, via a Bluetooth/WiFi on an Internet of Things (IoT) platform.

The remote field controller and sensor data output may be integrated with actuators and operators associated with field equipment to automate field management tasks based on predefined triggers. For instance, irrigation and fertilization systems may be integrated to operate based upon the data output of the remote field controller and sensor. The remote field controller and sensor may be integrated with other equipment where there is a need for integrated field management systems. In a simple form, the remote field controller and sensor may be used as a weather station. In other forms, the remote field controller and sensor may be customized to serve in many agricultural industries including, but not limited to, precision agriculture, field, turf, garden, greenhouse and golf course management, crop breeding and improvement, field sensing, and "smart farming." As will become apparent from the discussion that follows, the remote field controller and sensor is modular and may be provided with a wide variety of sensors, and thus the remote field controller and sensor is scalable to different crops and environments, and its measurements and data generation can be customized accordingly.

DESCRIPTION OF FIGURES

FIG. 13 is a schematic diagram showing one embodiment of interfacing the remote field controller and sensor with field management equipment.

DETAILED DESCRIPTION

Figure 1:
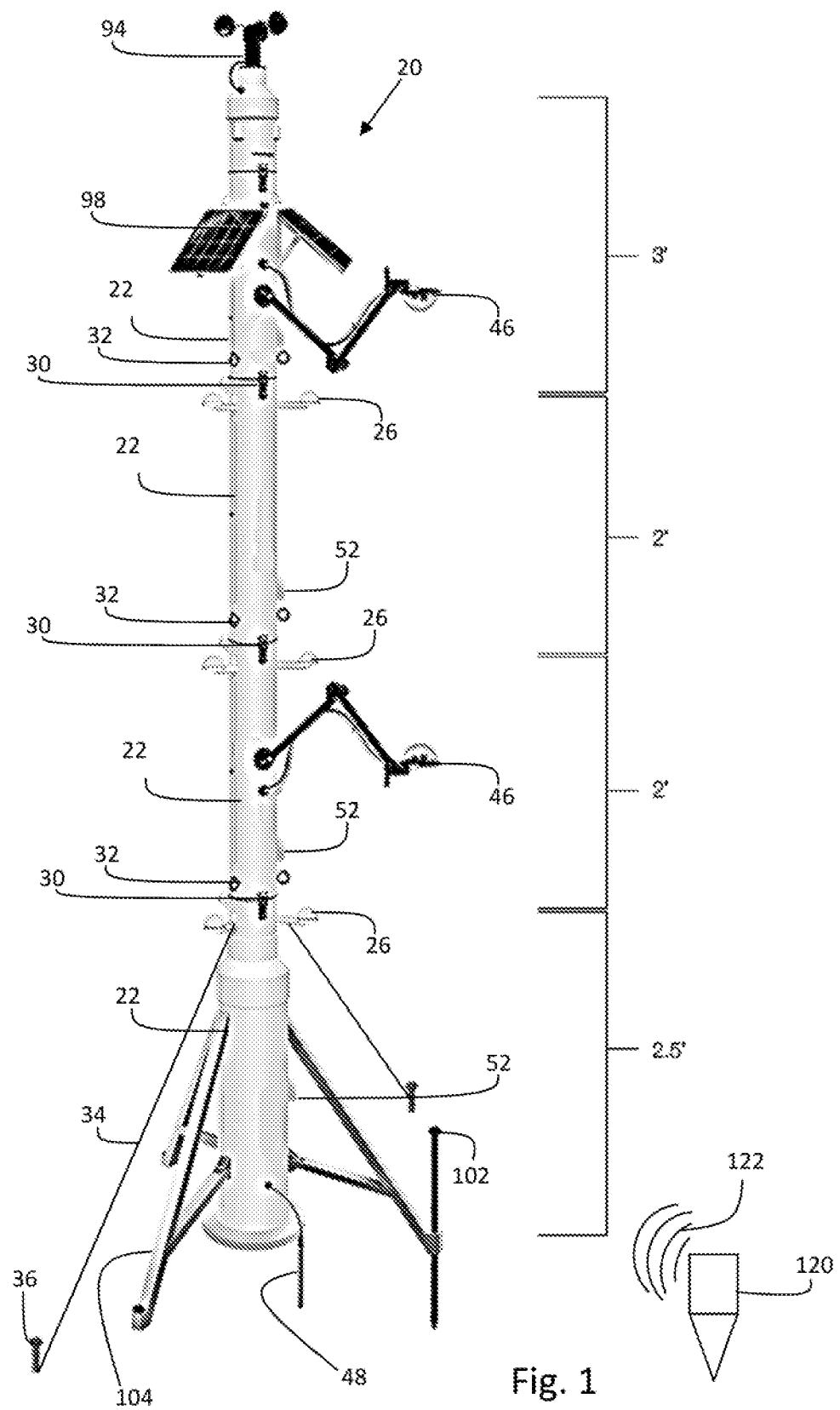
FIG. 1 shows a perspective view of an exemplary remote field controller and sensor as more fully described herein.
Figure 2:
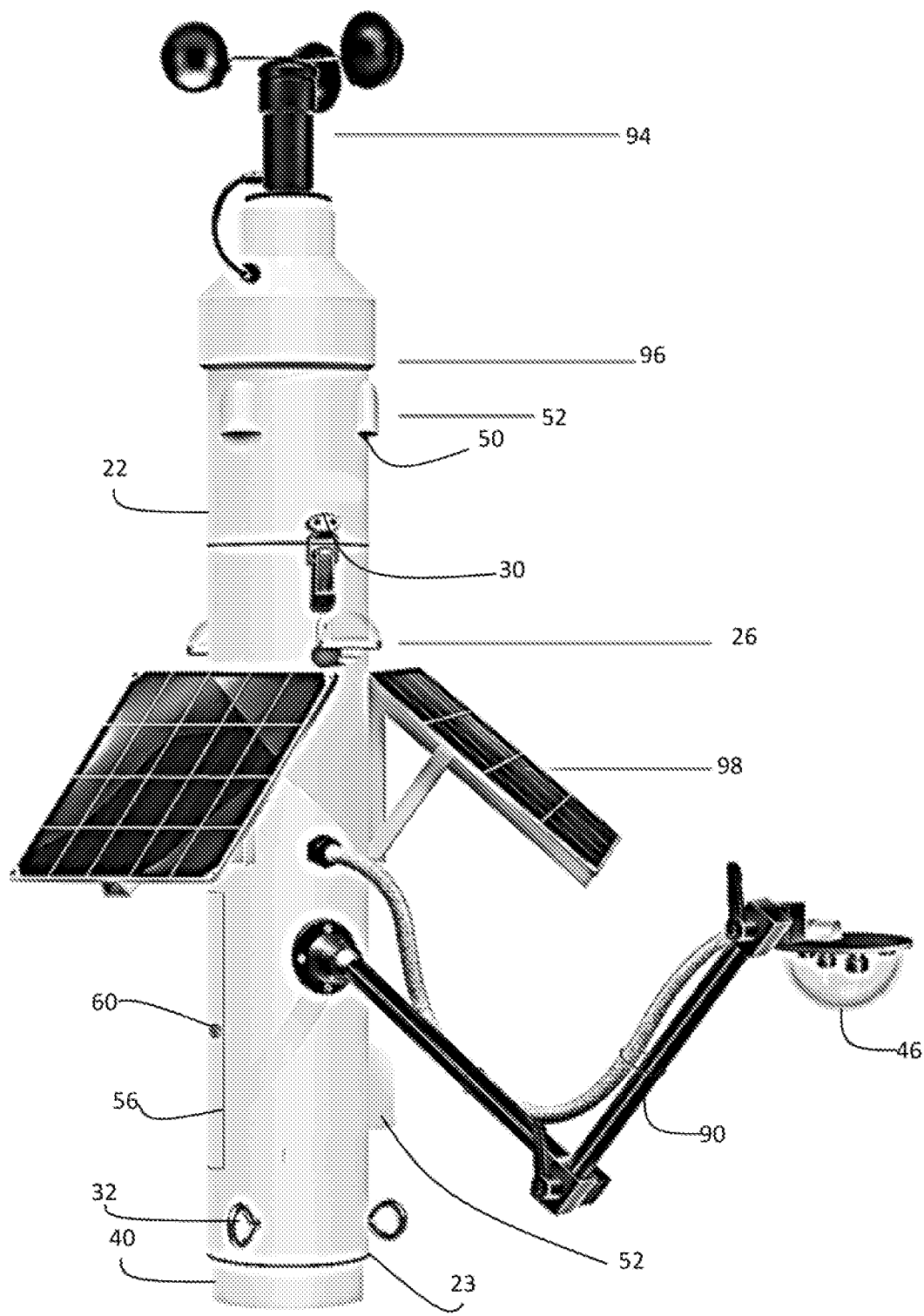
FIG. 2 is an illustrative view of a top or upper module of the remote field controller and sensor of FIG. 1.

FIGS. 1-8 show a first embodiment of an exemplary remote field controller and sensor 20, and FIGS. 9-12 show a second embodiment 200 of an exemplary remote field controller and sensor. Like parts in each embodiment will be indicated with the same reference characters. Referring to FIGS. 1-8, the remote field controller and sensor 20 may comprise a plurality of modules 22 removably connected to each other to form an elongate body for the remote field controller and sensor. Each module 22 may comprise a tubular member with axial opposite ends upon which an adjoining module may be stacked to form the remote field controller and sensor. A gasket 23 may be provided to seal each module. The tubular member of each module 22 may be cylindrical in shape. The module 22 may be made from PVC plastic, for instance 4" diameter schedule 40 PVC pipe. The module may be lined with additional structural material to provide additional rigidity for the module. For instance, the module may have an aluminum cylindrical inner casing, which may be embedded in the PVC wall. Although not necessary, the module 22 may have a hollow interior 24 into which specific crop and environmental sensors 26 (FIG. 6) and other electronic equipment 28 (FIG. 6) may be housed. The module 22 is configured to protect the crop and environment sensors 26 and the electronic equipment 28 housed in the hollow interior from the elements. Each module 22 may be approximately two to three feet tall. The modules 22 allow the operator the ability to vary the height of the field controller and sensor by stacking the modules together end to end, which in turn allows users to scale their particular system with varying crop sizes within crop rotations.

Figure 8:
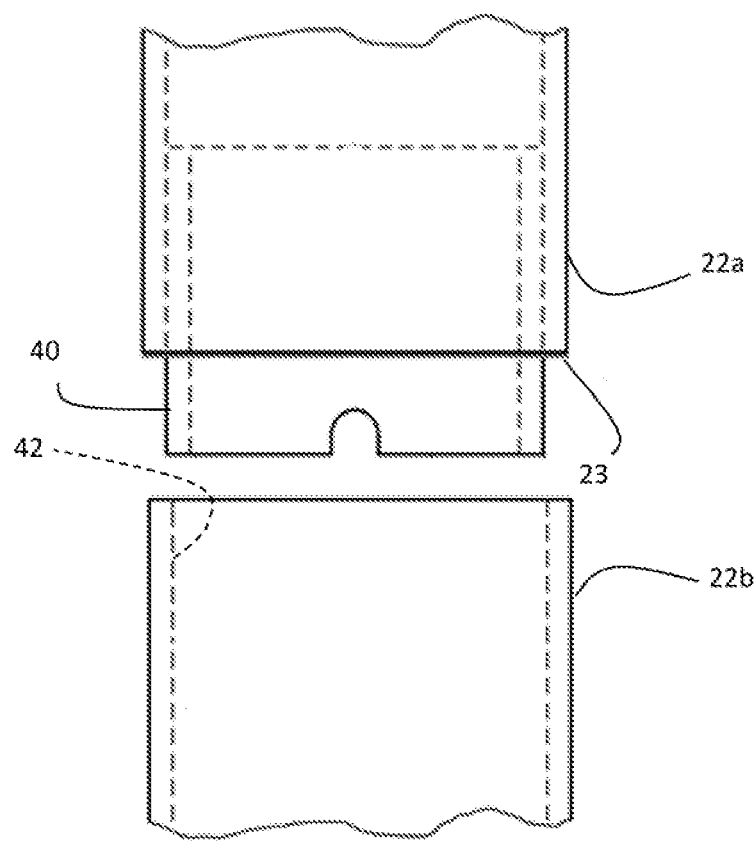
FIG. 8 is a sectional view of the internal configuration of axial ends of adjoining modules of the remote field controller and sensor of FIG. 1.
Figure 9:
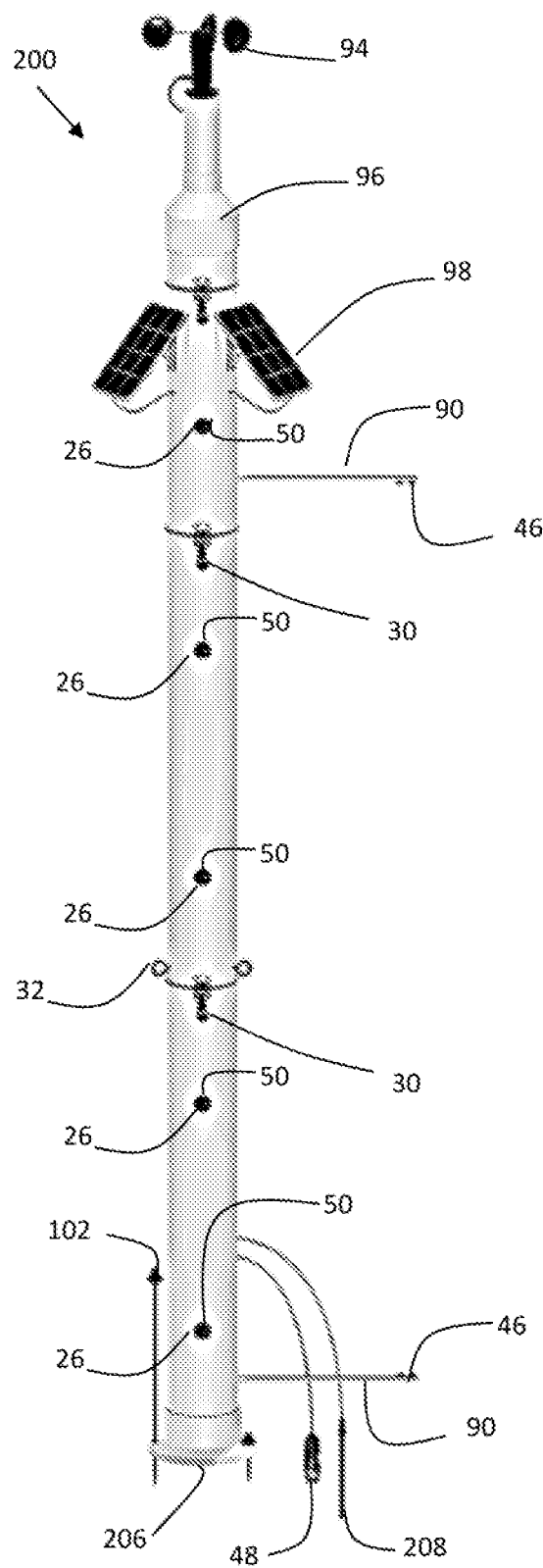
FIG. 9 shows a front elevational view of an alternate embodiment of the remote field controller and sensor of FIG. 1.

Each module 22 may have air vents and an optional fan for cooling the sensors 26 and the electronics 28 contained in the hollow interior 24 of the module. The crop and environmental sensors 26 and the electronics 28 of each of the modules may be configured to act independently of one another or in concert with one another, as will become evident from the description that follows. The remote field controller and sensor modules 22 may be connected to one another with buckle type latches or toggle clamps 30 that allow for removable assembly of the modules to form the remote field controller and sensor, and the adding or removing of modules as needed depending upon the application. The buckles and latches 30 may be provided on adjoining modules evenly spaced about the outer surfaces of the modules (e.g., 3 latches and buckles—120° degrees apart, 4 latches and buckles—90° apart). Eyelets 32 may also be provided for guy wires 34 that are anchored with ground stakes 36. The eyelets 32 may be provided evenly spaced about the outer surfaces of the modules (e.g., 3 eyelets—120° degrees apart, 4 eyelets—90° apart). As shown in FIG. 8, the upper arranged module 22a may have a smaller diameter cylindrical surface 40 extending from one axial end and the lower arranged module 22b may have a bore 42 sized to receive the smaller diameter cylindrical surface 40 of the upper arranged module. The arrangement shown in FIG. 8 may also be reversed, and the lower arranged module may be provided with the smaller diameter cylindrical surface and the upper arranged module may have the bore into which the smaller diameter cylindrical surface is received.

The hollow interior 24 of each module 22 may be sized to accommodate the electronics 28 and any other equipment needed to power the specific crop and environmental sensors 26 incorporated into each module and may include space to house a battery or power source 44 (FIG. 6) for one or more modules. In addition to the crop and environmental sensors 26, the electronics and internal module equipment 28 may include computers, interface electronics, power supplies 44 and wireless transmitters. The crop and environmental sensors 26 may be configured for data collection of light, soil temperature and moisture, wind speed, atmospheric temperature, pressure and humidity. The crop and environmental sensor 26 functions may be combined or separate. The electronics and other internal module equipment 28 may be configured to allow multiple and diverse sets of crop and environmental sensors 26 to be installed in the module and provide an integrated and flexible data collection and processing platform. For instance, the electronics and other internal module equipment 28 may be based upon an Internet of Things platform that allows fast and seamless connection of an environmental and crop sensor to the cloud via the internet. The platform may include a mobile software development kit that enables fast integration with other components, and easy development of software applications. The mobile/hub associated with the system serves as a gateway and communicates data from an environmental and crop sensor to the cloud platform. The cloud platform aggregates information and allows for processing of large amounts data. One embodiment of a computer may include a Raspberry Pi™ developed by the Raspberry Pi Foundation. The electronics and other internal module equipment 28 may include hardware and software development kits that interface the sensors to wireless equipment for transmission to the cloud. The electronics and internal module equipment 28 may also be removably mounted within the interior to allow for customization or reconfiguration as required.

The crop and environmental sensors 26 may be configured for collection of data related to conditions of light, soil temperature and moisture, wind speed, atmospheric temperature, pressure and humidity. The crop and environmental sensor functions may be combined or separate. The crop and environmental sensors 26 are available commercially, for instance, from www.adafruit.com and other suppliers that make such equipment for interfacing with Raspberry Pi platforms. A camera system 46, for instance, an infra-red, CCD device, or image camera may be provided. Such a camera system 46 is also available commercially, for instance, from www.adafruit.com and other suppliers that make such equipment for interfacing with Raspberry Pi platforms. A minirhiztron system 48 may also be provided. Such a minirhiztron system 48 may include a Dino-lite Digital microscope provided by Microscope, LLC. A $CO_2$ meter may be provided by CO2Meter.com.

Each module 22 may be provided with windows 50 that open from the outer exterior surface of the module to the hollow interior 24 of the module that allow the crop and environmental sensors 26 to sense environmental conditions. The window 50 may be shaded with a rain hood 52. The windows 50 may allow for ventilation of the hollow interior 24 of the module 22, and when utilized with sensors 26, the windows may be arranged at a set or common spacing along each module 22, and overall on the remote field controller and sensor 20, so as to provide for gradient measurements of certain environment conditions along the length of the field controller and sensor. For instance, the windows 50 may be configured for environmental and crop sensors that measure light quantity and quality, temperature, barometric pressure, and $CO_2$ levels. The windows 50 may be provided at 1 foot intervals along the remote field controller and sensor 20. The rain hoods 52 may be provided over the windows to prevent the environmental elements from interfering with the sensor data collection.

Figure 6:
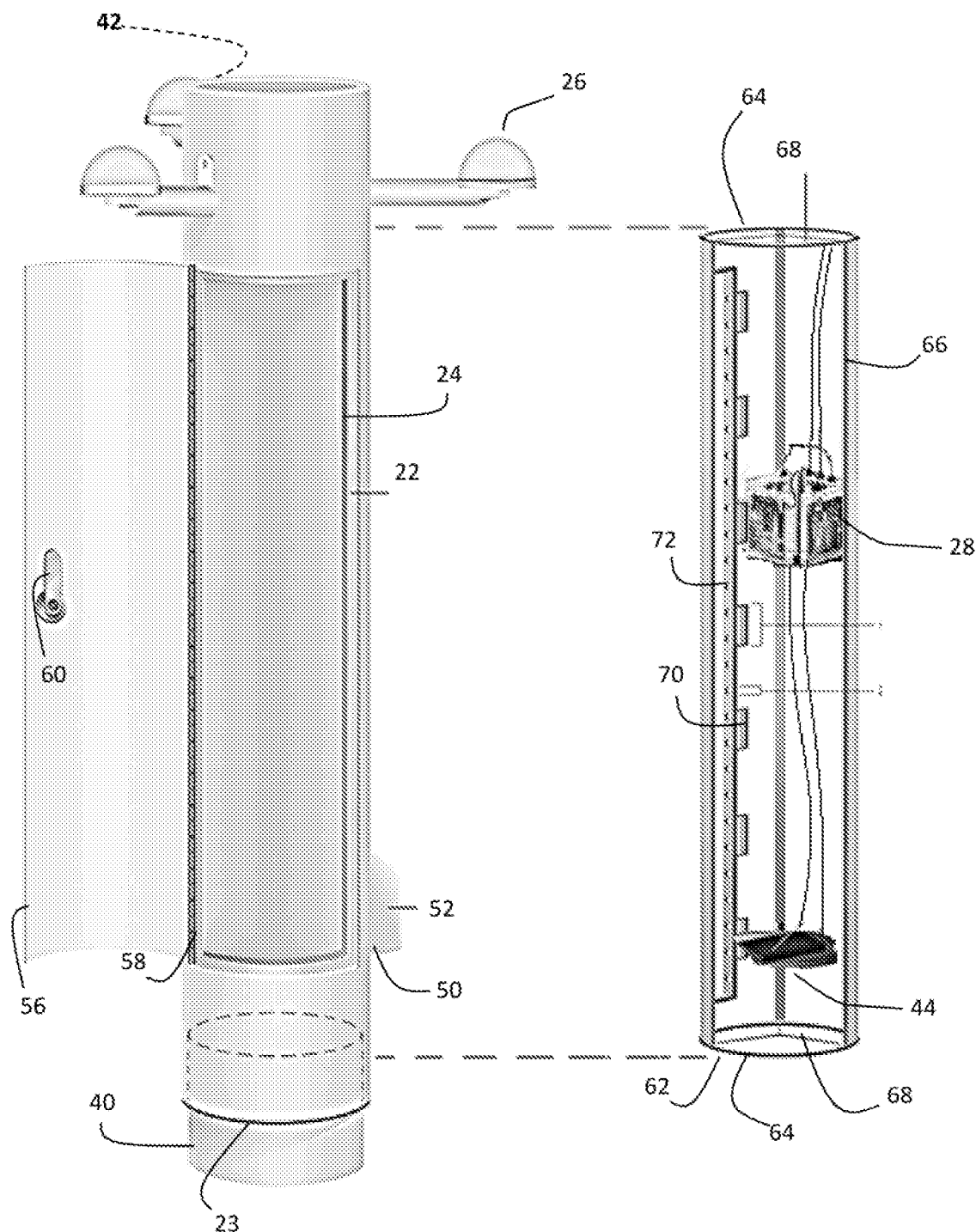
FIG. 6 is an illustrative view of an intermediate or middle module with an internal mounting rack shown removed from a hollow interior of the middle module.
Figure 7:
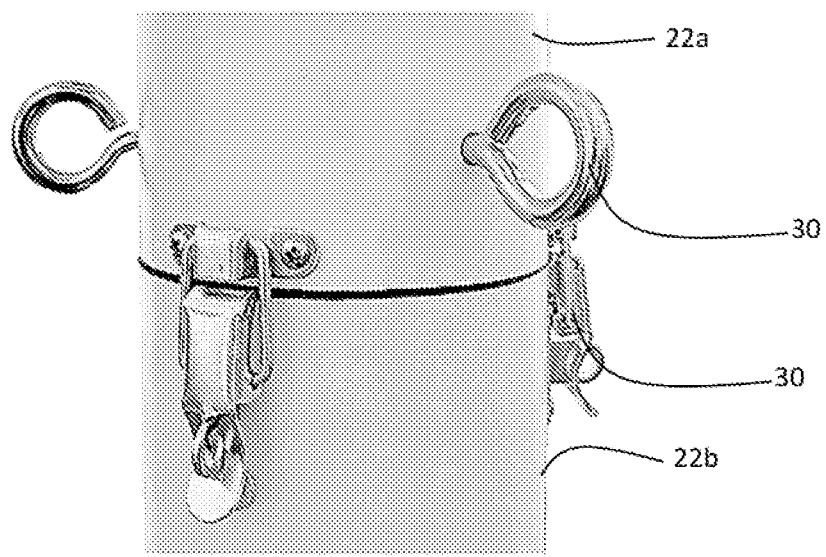
FIG. 7 is an illustrative view depicting the modularity of the modules of the remote field controller and sensor of FIG. 1.

In one aspect, for instance, as shown in FIG. 6, the module may be provided with an access panel 56 that permits access to the hollow interior 24 of the module 22. The access panel 56 may be connected to the module with a plano hinge 58. The access panel 56 may be made from a metallic material, for instance, aluminum or another lightweight material that provides additional structural integrity for the module.

The hinge 58 may also be connected to the structural material lining the interior of the module, for instance, the aluminum lining. The access panel 56 may be hingely connected to the structure of the module 22, thereby allowing the user the ability to open and close the access panel and access the hollow interior of the module and any sensor 26 or equipment 28 stored therein. A closure mechanism 60 may maintain the access panel 26 in the closed position sealing the internal contents of the module.

To allow organization of the sensors and electronic equipment in the module, the module may be provided with a storage rack 62 as shown in FIG. 6. The storage rack may fit within the hollow interior 24 of the module 22 and hold the sensors 26 and associated electronics 28. In one embodiment, the storage rack 62 may comprise a cage like structure with axial opposite end rings 64, support bars 66 extending axially between the end rings, and a spoke structure 68 on each the axial rings. The support bars 66 may have a plurality of slots 70 and a plurality of holes 72 extending along a length of the support bar from one axial end ring 64 to the opposite axial end ring 64. The plurality of slots 70 and the plurality of holes 72 may act as locator points for the mounting of the sensors 26 and associated electronics 28 within the module 22, thereby allowing the sensors and associated electronics to be stacked axially on the support rack within the hollow interior of the module. The storage rack 62 may be removable from the access opening 60. The spokes 68 on the axial ends of the storage rack 62 may be used as handles to facilitate installation and removal of the storage rack from the hollow interior 24 of the module 22.

Figure 10:
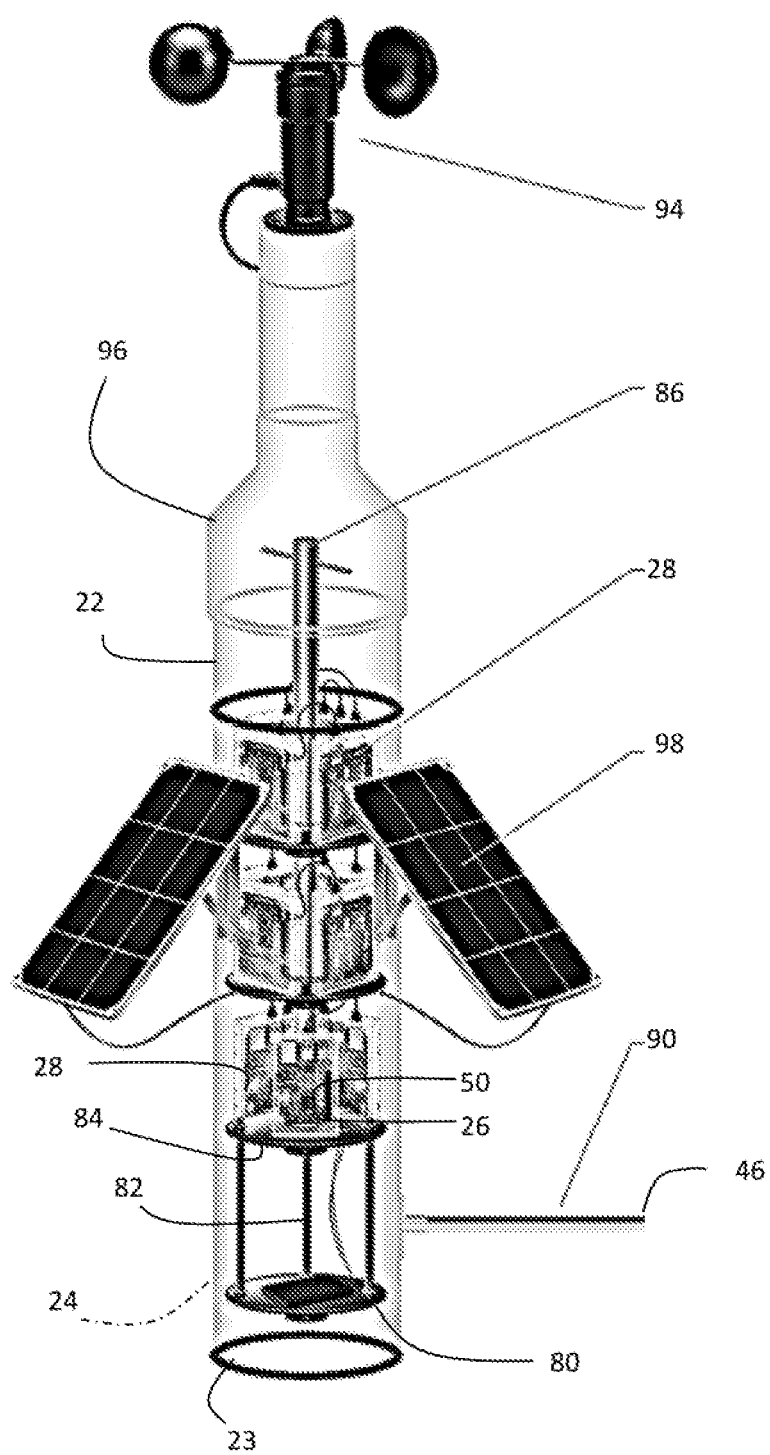
FIG. 10 is an illustrative view of a top or upper module of an alternate embodiment of the remote field controller and sensor of FIG. 9.
Figure 11:
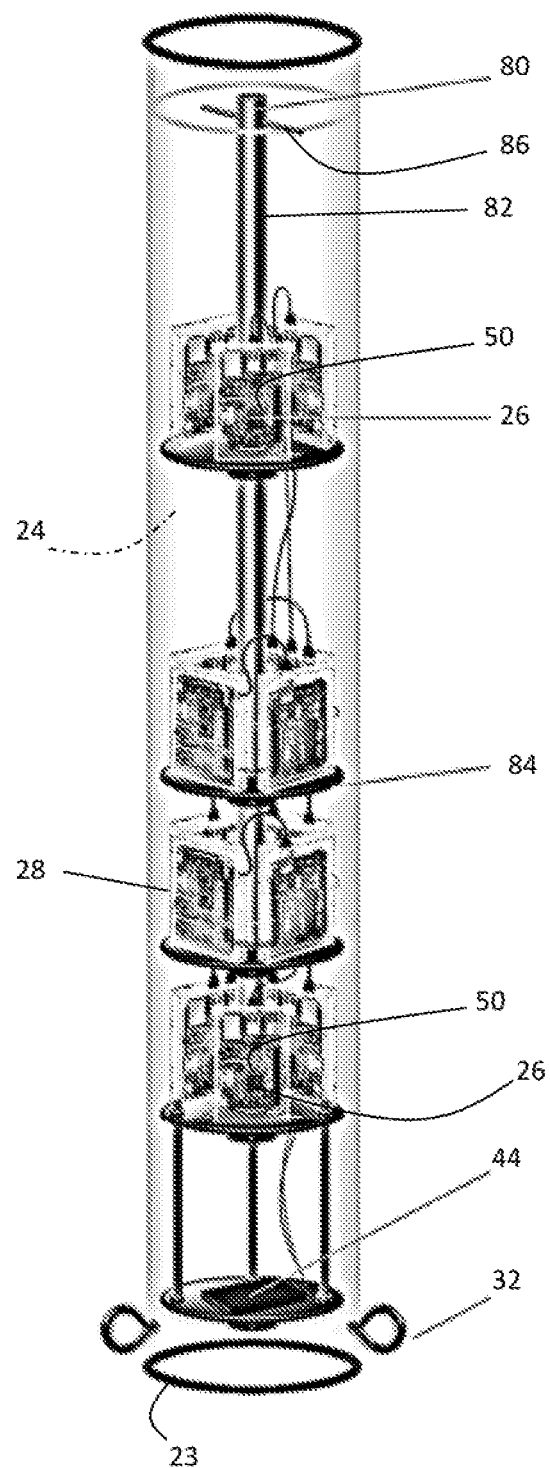
FIG. 11 is an illustrative view of an intermediate or middle module of the remote field controller and sensor of FIG. 9.
Figure 12:
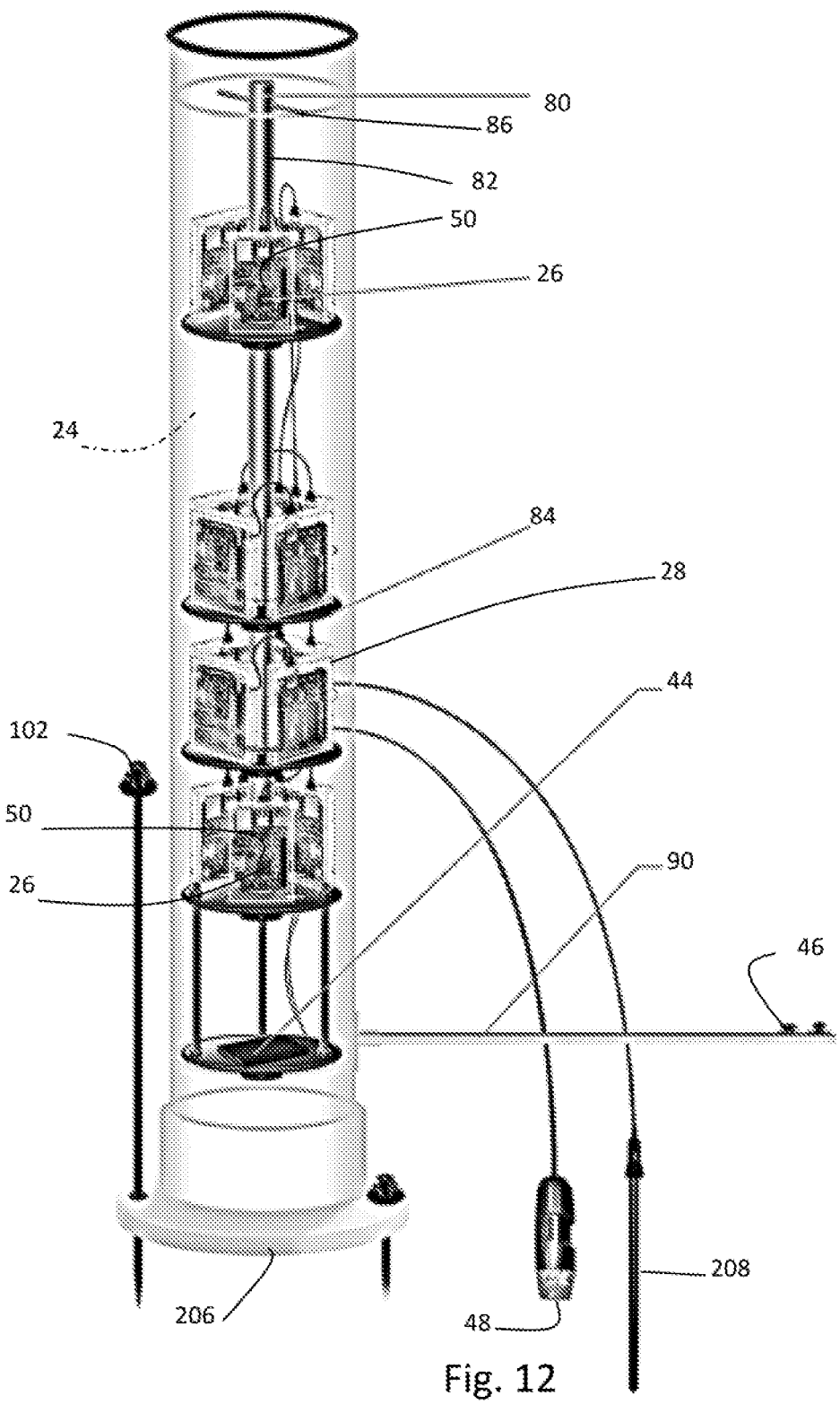
FIG. 12 is an illustrative view of a base or lower module of the remote field controller and sensor of FIG. 9.

In another aspect as shown in FIGS. 10-12, the hollow interior 24 of the module 22 of the remote field controller and sensor 200 may be provided with a shelving unit 80. The shelving unit 80 may comprise a center, cylindrical pole 82 with angle brackets or adjustable disk-like shelves 84 extending radially outward from the center pole. The shelving unit 80 may be insertable into the hollow interior 24 of the module 22 through the open axial ends of the tubular member comprising the module 22. The one or more shelves 84 may have an outer periphery which matches the bore of the hollow interior 24 of the module 22 so as to limit relative motion between the shelf and the hollow interior of the elongate body of the module. One or more of the shelves 84 may be adjustable along the length of the shelving unit 80 to allow customizing of the module for particular number of crop and environmental sensors 26 and electronic components 28 to be installed therein. The shelves 80 may also be adjustable radially depending upon the size of the sensors 26 and the equipment 28 to be mounted thereon. The shelf or angle brackets may provide support for the electronics and other equipment 28 housed in the hollow interior of each module. The shelving unit 80 may have a handle 86 at one end to allow the shelving unit to be removed from the hollow interior 24 of the module 22 with the sensors 26 and the electronic components and internal module equipment 28 installed thereon. Thus, the shelving unit 80 may be removed from the module 22 and worked on, for instance, for repair, maintenance, and/or customization as needed for a particular application, and then reinstalled in the hollow interior 24 of the module 22. The shelving units 80 of adjacent modules 22 may be removably connectable to each other through the open axial ends of the tubular member comprising the module 22 to allow a more rigid assembly of adjacent modules. The opposite end of the shelving unit may also include support brackets, e.g., extending from the center pole, that interface with and cooperate with the hollow interior of an adjacently mounted module, thereby allowing the modules to be releasably assembled together while supporting the shelving units of adjacent modules.

The camera or imaging system 46 of the remote field controller and sensor 20,200 may be configured to provide imaging the canopy of the measured crops. The camera or imaging system 46 may be mounted on a boom or arm 90 that projects from the outer surface of the module 20,220. The arm 90 may be removably attachable to the outer surface of a module in the event imaging of the canopy is not desired in a particular application. The arm 90 may be articulated, telescopic, and/or otherwise adjustable along its length to allow customization of its length as desired in a particular application. The camera or imaging system 46 may be configured to provide hemispherical imaging of the canopy of the measured crops. The camera or imaging system 46 may include a fish-eye lens for hemispherical canopy photography or imaging. The camera or imaging system 46 may include infra-red or near infra-red imaging device or a CCD device, which may prove useful in determining water retention or loss in the canopy of the measured crops. One of the arms 90 may be provided on an upper arranged module, and the other arm may be provided on a lower arranged module. In this configuration, the arms 90 may be configured to allow the imaging of the canopy between the two arms 90, thereby providing a more detailed analysis of canopy architecture, leaf angles, lead distribution, canopy geometry and openness, and leave area indices. Cables 92 associated with camera may be external to the arm as shown in FIGS. 1-8 or internal to the arm as shown in FIGS. 9-12.

The remote field controller and sensor 20,200 may be provided with an anemometer 94 at its topmost portion to measure wind speeds without interference from the measured crops. The anemometer 94 may be provided on a cap 96 with is removably attachable to the upper or top arranged module via the toggle clamp 30. In the alternative, the cap may be press fit on the axial end of the uppermost arranged module. The cap may have air vents and a fan to assist in circulation in the hollow interior of the field controller and sensor.

The remote field controller and sensor 20,200 may be provided with solar panels 98 for powering the on-board electronics 28 and the sensors 26. The solar panels 98 may be movable between a stowed position in which the panels are pivoted against the outer surface of the module 22, and deployed position in which the solar panels are flared out in a fan-like pattern. The solar panels 98 may be provided on an upper arranged module so as to reduce interference from the measured crops. The solar panels 98 may be configured to power a specific module or multiple modules. Depending on the number of modules used to form the remote field controller and sensor, the number of solar panels may be varied as needed. While the drawings show three solar panels, additional solar panels may be provided as needed. One or more solar panels 98 may be operatively connected to the battery source 44 located within the hollow interior of one or more of the modules, and configured to allow charging of the battery source 44, as needed. Thus, the remote field controller and sensor may be a net-zero energy device.

One of the modules, e.g. serving as the lowest arranged or base module, may specifically accommodate connections for the soil measuring devices such as a minirhizotron soil imager 48 or a soil moisture probe 208 for measuring soil conditions such as soil water content, soil nutrients, and soil pH. The remote field controller and sensor 20,200 may be secured to the ground using landscape spikes 102. The landscape spikes 102 may be directed through legs 104 or a base plate 206 of the lower or base module. As mentioned, the other landscape spikes 36 may be connected to the guy wires 34 extending from the spikes to guy wire eyelets 32 on one or more of the modules 22. The spikes 36,102 may be set into solid ground below plowed farm soil in a manner to accommodate crop spacing and provide maximum stability for the remote field controller and sensor 20,220. Additionally, a tripod support 104 (collapsible or fixed) may be added to the lower or base module to provide additional rigidity for remote field controller and sensor 20,200 when deployed in-field. The lowermost arranged module may be press fit into the adjoining intermediate module or may be connected together using the toggle clamp latch mechanism 30.

Figure 3:
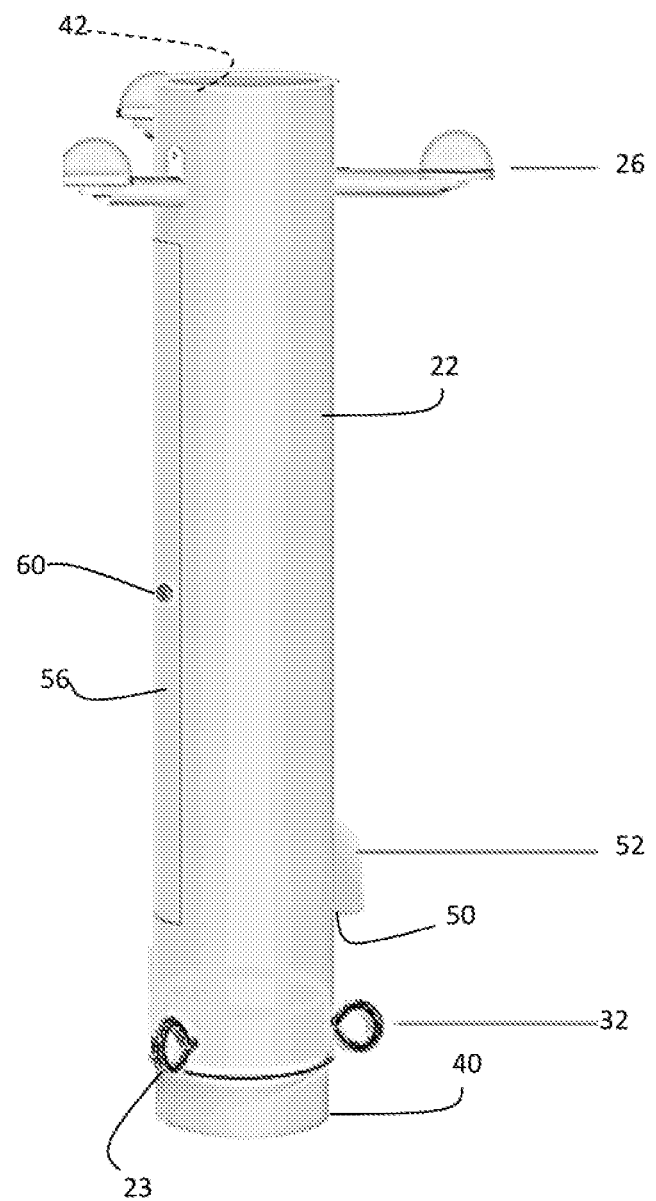
FIG. 3 is an illustrative view of an intermediate or middle module of the remote field controller and sensor of FIG. 1.
Figure 4:
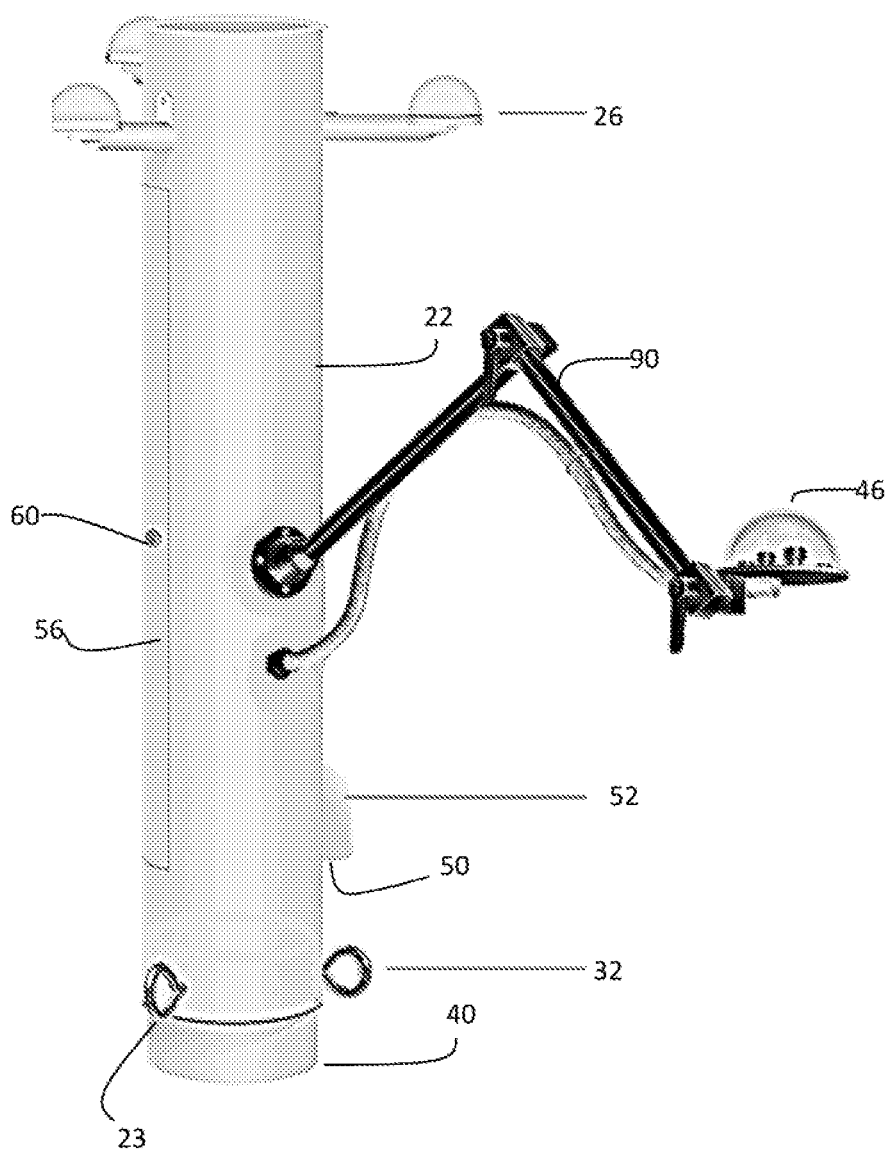
FIG. 4 is an illustrative view of another intermediate or middle module of the remote field controller and sensor of FIG. 1.

By way of example, for instance as shown in FIGS. 3 and 10, the upper or top module may have the cap 96 that includes the anemometer 94 and seals the top open end of the module. The uppermost arranged or top module may include the solar panels 98 and sensors 26 for measuring temperature, humidity, $CO_2$, light quality and quantity and barometric pressure. The number of sensors 26 may vary as desired and may include 10 sensors. The electronics 28 may be provided in the module to control operation of the sensors and collect measured data. The sensors 26 and electronics 28 may be customized for a particular application. The uppermost arranged or top module may also be provided with the camera system 46 and camera arm 90. The camera arm 90 may be telescoping and provide imaging of the top of the crop canopy. The imaging may be IR, and may include a fish eye camera. The camera 46 may be aimed downward toward the base module. Additional room on the camera arm may accommodate additional sensors, e.g., laser proximity sensor/LI DAR, ultrasound, multispectral and hyperspectral sensors. The uppermost arranged or top module may also include a wireless transmitter.

By way of example, for instance as shown in FIGS. 3,4,6, and 11, the middle or intermediate module or modules may include sensors 26 for measuring temperature, humidity, $CO_2$, light quality and quantity and barometric pressure. The number of sensors 26 may vary as desired and may include 20 sensors. The electronics 28 may be provided in the module to control operation of the sensors 26 and collect measured data. The sensors 26 and electronics 28 may be customized for a particular application. Because the power requirements of the middle modules may be less than other modules, the middle modules may be powered together in series.

Figure 5:
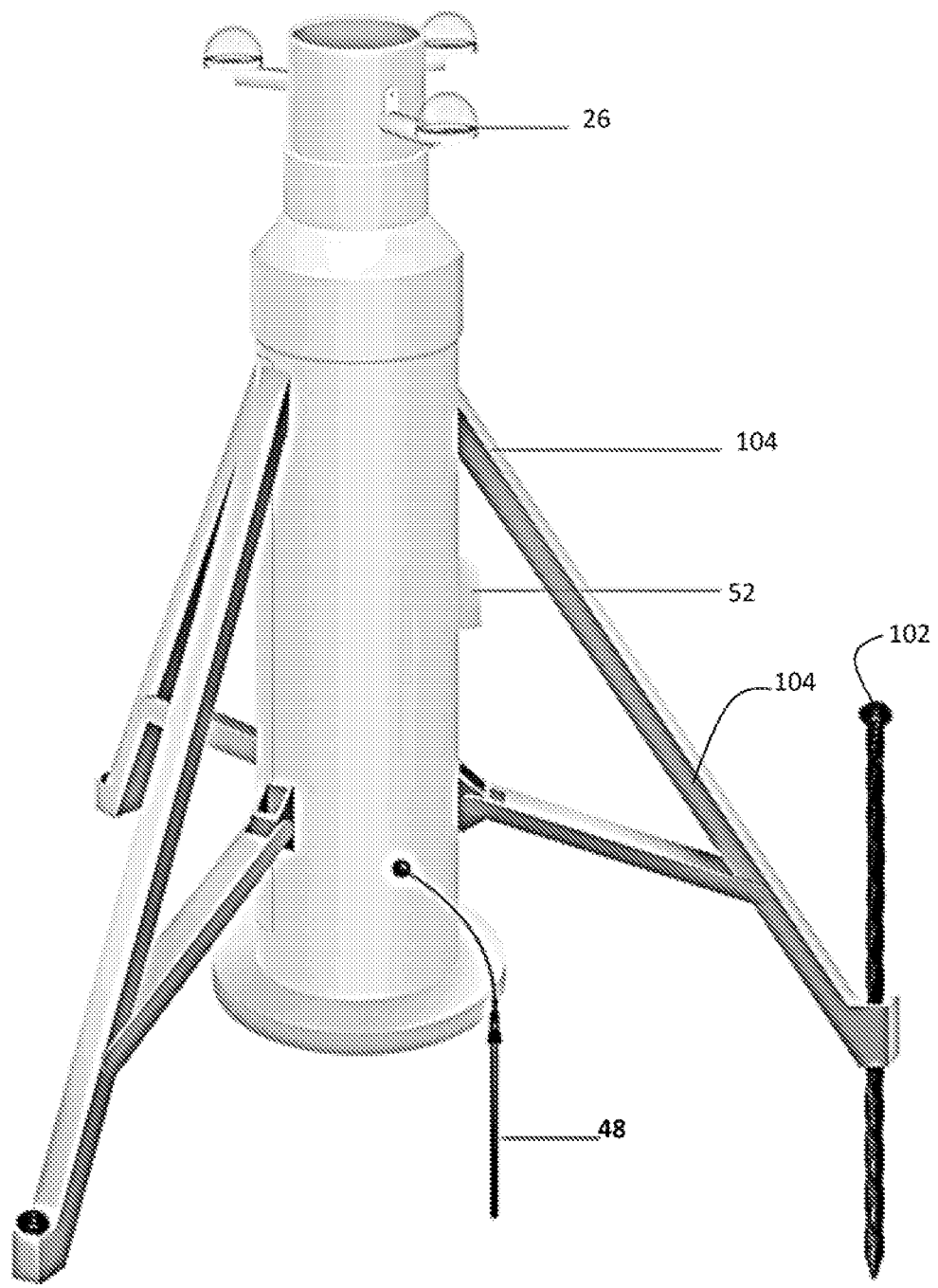
FIG. 5 is an illustrative view of a base or lower module of the remote field controller and sensor of FIG. 1.

By way of example, for instance as shown in FIGS. 5 and 12, the lower or base module may be provided with the electronics 28 for operation of the base module crop and environmental sensors 26, the minirhizotron imaging system 48, and/or the soil moisture probes 208. The base or lower module sensors 26 may be configured for measuring temperature, humidity, $CO_2$, light quality and quantity and barometric pressure. The number of sensors 26 may vary as desired and may include 10 sensors. The electronics 28 may be provided in the module to control operation of the sensors 26 and collect measured data. The sensors 26 and electronics 28 may be customized for a particular application. The base module (or a lower middle module, FIGS. 3,4,6,11) may also be provided with the camera system 46 and camera arm 90. The camera arm 90 may be articulated, telescoping, or otherwise adjustable, and provide imaging of the bottom of the crop canopy. The imaging may be IR, and may include a fish eye camera. The camera 46 may be aimed upward toward the uppermost arranged or top module. Additional room on the camera arm 90 may accommodate additional sensors, e.g., laser proximity sensor/LI DAR, ultrasound, multispectral and hyperspectral sensors.

Additionally, the remote field controller and sensor 20,200 may be configured to work with satellite soil probes 120 that are remote to the remote field controller and sensor. The satellite probes 120 may be configured to measure soil moisture, soil pH, soil temperature and soil nutrient composition. The satellite probes 120 may be powered by an on-board battery. The satellite probes 120 may be configured to send out soil related information through low energy waves 122, for instance, via Z-Wave, Bluetooth Low Energy, etc. The satellite probes 120 may be configured to operate under the soil beneath ground level. The satellite probes 120 may be configured with onboard GPS to help users locate buried sensors at the end of the crop cycle. A remote field controller and sensor 20,200 positioned in proximity to the satellite probes 120 may be configured to collect data from its sensors and from the satellite soil probes in the field.

The modular nature of the remote field controller and sensor 20,200 provides customization for optimum imaging and sensing of most commonly commercially grown crops. The remote field controller and sensor 20,200 may operate at different heights to accommodate farming equipment and different crop sizes. For instance, for crops below 5 feet in height, such as common grain sorghum, wheat, and soy bean, the remote field controller and sensor may be configured with three, 2 foot long modules, to a height of 6 feet, thereby allowing the top module camera boom or arm to image above the crop to effectively track the canopy's development. One may add also additional modules during plant growth. For instance, in an embodiment where the remote field controller and sensor is initially configured with three, 2 foot long modules, at a height of 6 feet, an additional module of 2 feet may be added during the growing season to create a remote field controller and sensor of 8 feet. This may prove useful for taller crops such as maize. The solar panels 98 and anemometer 94 may be located with the top module to provide optimum operation without interference from the measured crops. Barometric pressure, $CO_2$, temperature, humidity, and light sensors 26 along the length of the remote field controller and sensor may allow for individual readings to create a gradient of conditions and to track changing conditions.

As shown in FIG. 13, the remote field controller and sensor 20,200 may gather environmental and crop sensor measurements in the field and transmit the data via an onboard wireless transmitter. A central wireless receiver 220 may be integrated with one or more remote field controller and sensors 20,200 deployed in a field of crops 222. The central wireless receiver 220 may be integrated with other field operational equipment 224 to provide automated irrigation and delivery of water, pest-control or fertilization when and where it is needed. The data may be gathered in the field 222 and transmitted to a cloud computing and storage facility 226. The data may be processed via the cloud computing and storage facility 226 and transmitted to a user 228. The cloud computing and storage facility 226 may generate reports that are customized according to location, type of crops and time of the year. Real time data may be sent to a phone/tablet/PC 230 of the user 228, which allows the user to have better information for optimal growth of measured crops, and to implement and/or adjust input strategies at any time.

Figure 14:
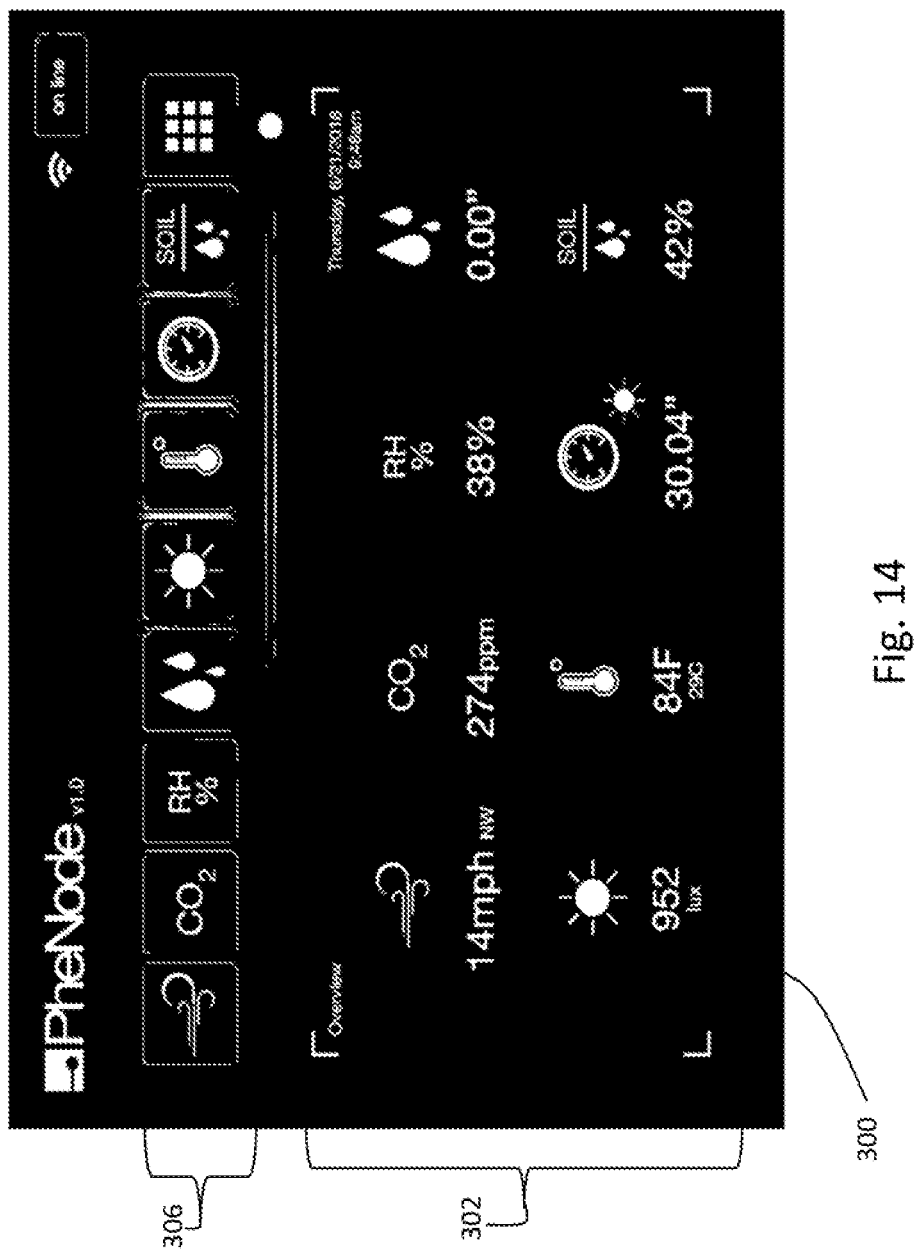
FIG. 14 is a portion of a graphic user interface for remote control of remote field controller and sensor.
Figure 15:
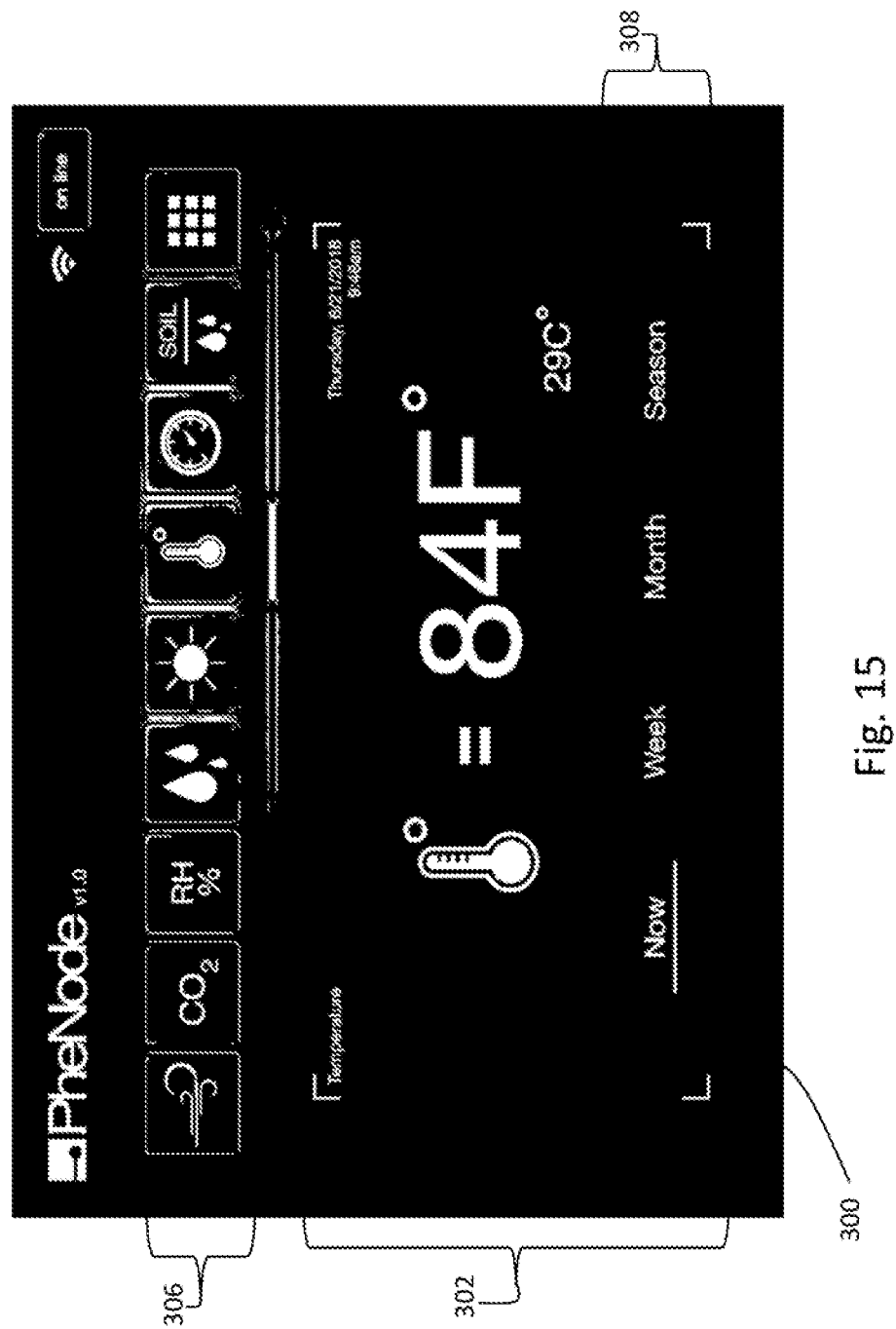
FIG. 15 is another portion of a graphic user interface for remote control of remote field controller and sensor.
Figure 16:
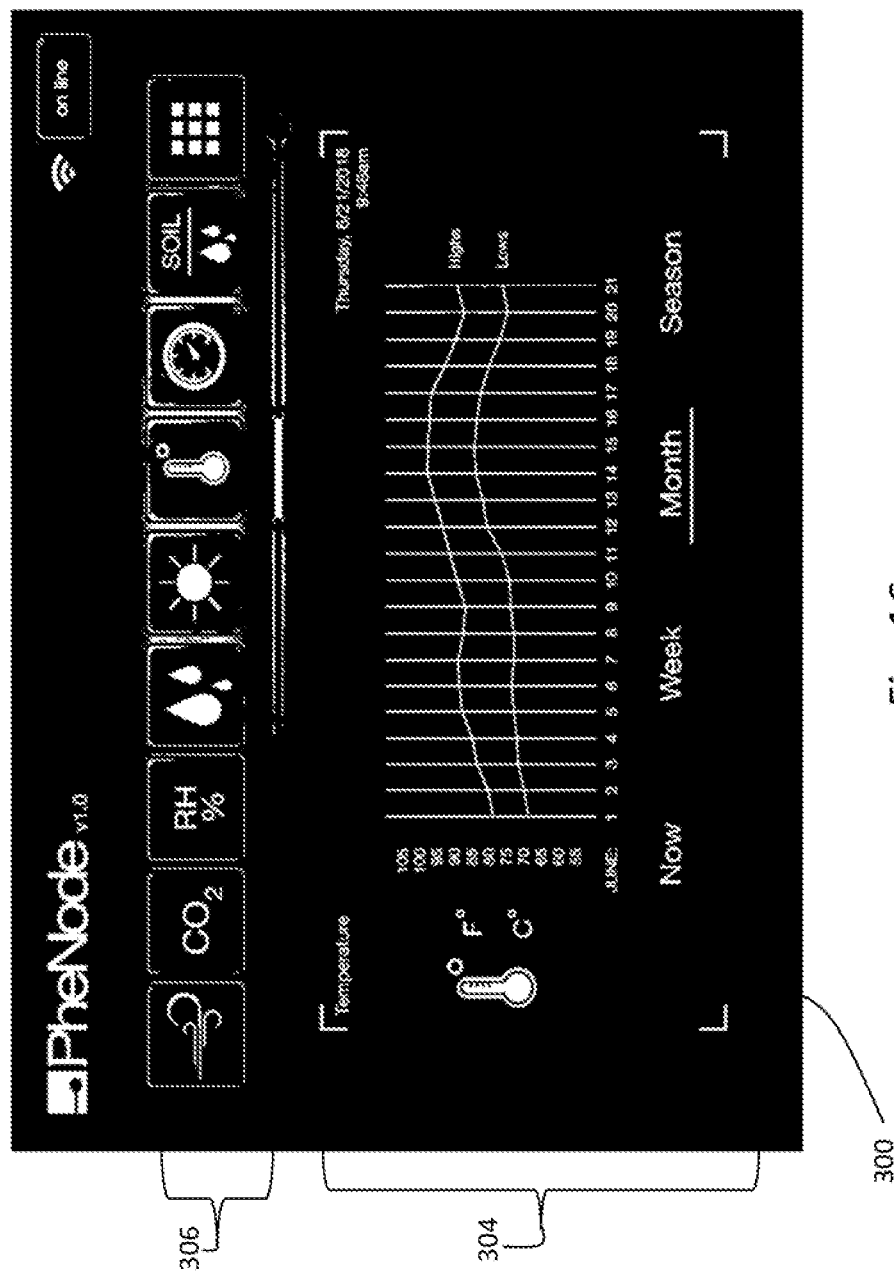
FIG. 16 is another portion of a graphic user interface for remote control of remote field controller and sensor.

FIGS. 14-16 show an exemplary graphic user interface 300 that may be displayed on a phone/tablet/PC 230 to allow the user 228 to interface with the remote field controller and sensor 20,200. The user 228 may select one of many remote field controllers and sensors 20,200 and access in real time conditions 302 being monitored and sensed by the remote field controller and sensor, as well as historic data 304 (FIG. 16). The data and information accessible through the graphic user interface 300 may correlate to the sensors deployed and configured on the remote field controller and sensor, and may include functionality to allow the user to remotely control systems 224 for irrigation and delivery of water, pest-control or fertilization. The graphic user interface 300 may be configured to display current conditions 302 at one or more remote field controllers and sensors, including by way of example wind speed, $CO_2$ levels, relative humidity, precipitation, light, temperature, barometric pressure and soil moisture levels. Historic data 304 for a particular condition may be accessed through the icons 306 for each condition. For instance, FIG. 14 shows the graphic user interface 300 comprising a dashboard of current conditions 302 at a particular remote field controller and sensor. FIG. 15 shows the graphic user interface 302 after selection of the temperature icon, and including additional prompts 308 for historic data. FIG. 16 shows the graphic user interface 300 after selection on the month historic temperature data 306. The graphic user interface allows operators to have better information for optimal growth of measured crops, and to implement and/or adjust input strategies at any time. The modular nature of the remote field controller and sensor provides easy, on-site customization for optimum imaging/sensing of diverse crops.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed:

1. A field controller and sensor to monitor directly within a plant canopy comprising an elongate body having a hollow interior and axially opposite first and second ends with a first arm extending outward from the elongate body adjacent to the first axial end and a second arm extending outward from the elongate body adjacent to the second, axially opposite end, each of the arms having an imaging device mounted thereon, the first arm imaging device being positioned to obtain images in a direction toward the second axial end of the elongate body, the second arm imaging device being positioned to obtain images in a direction toward the first axial end, the first and second arms being spaced apart from one another along a length of the elongate body at a distance sufficient to image a canopy of crop growth in a field in which the field controller and sensor is deployed, the body comprising a plurality of sensors, a portion of the plurality of sensors being adapted and configured to sense at least one environmental and crop characteristic, the environmental and crop characteristic comprising at least one of temperature, humidity, $CO_2$, barometric pressure, light quantity, light quality, and air quality, wherein at least three sensors in the portion of the plurality of sensors are adapted and configured to measure a like environmental and crop characteristic, and the at least three sensors are arranged with a common spacing interval along a length of the elongate body.

2. The controller and sensor of claim 1 wherein the imaging device of at least one of the first and second arms is a camera.

3. The controller and sensor of claim 1 wherein the imaging device of at least one of the first and second arms is an infra-red imaging device.

4. The controller and sensor of claim 1, wherein at least one of the first and second arms has an adjustable length of projection from the elongate body.

5. The controller and sensor of claim 1, wherein at least one of the first and second arms includes at least one additional sensor.

6. The controller and sensor of claim 1, wherein the imaging device of at least one of the first and second arms includes a fish eye lens.

7. The field controller and sensor of claim 1 wherein the elongate body comprises first and second modules removably connectable to each other.

8. The controller and sensor of claim 7 further comprising a third module removably connectable with and disposed between the first and second modules.

9. The controller and sensor of claim 8 further comprising a fourth module removably connectable with at least two of the first, second and third elongate bodies.

10. The controller and sensor of claim 1 wherein another portion of the plurality of sensors are configured to sense at least one of wind speed and direction, rainfall, soil moisture, soil temperature and nutrient composition, and root growth.

11. The controller and sensor of claim 10 wherein the elongate body includes an access opening into the hollow interior of the elongate body.

12. The controller and sensor of claim 11 wherein the access opening comprises a panel on an outer surface of the elongate body.

13. The controller and sensor of claim 10 wherein at least one of the plurality of sensors is housed in the hollow interior of the elongate body.

14. The controller and sensor of claim 10 further comprising a sensor mounting structure removably insertable into the hollow interior of the elongate body.

15. The controller and sensor of claim 14 wherein the sensor mounting structure has engagement surfaces configured to allow at least one of the sensors to be removably mounted to the sensor mounting structure.

16. The controller and sensor of claim 1 further comprising a wireless transmitter configured to transmit data representative of output of the sensors.

17. The controller and sensor of claim 16 further comprising a processor configured for communication with a plurality of remote computers via a network and a memory, the processor being configured to store a data structure in the memory, the data structure comprising a plurality of data items associated together as crop and environmental conditions sensed by the field controller and sensor; and provide the data structure to a plurality of remote computers via the network in accordance with criteria associated with a user of the system.

18. The controller and sensor of claim 17 wherein the processor is further configured to activate field management equipment based upon the data.

19. The controller and sensor of claim 18 wherein the field management equipment includes at least one of an irrigation system, a water delivery system, a pest-control delivery system, and a fertilization delivery system.

20. A field controller and sensor to monitor directly within a plant canopy comprising at least two tubular members releasably connected to each other to form elongate body having a hollow interior and axially opposite first and second ends with a first arm extending outward from the elongate body adjacent to the first axial end and a second arm extending outward from the elongate body adjacent to the second, axially opposite end, each of the arms having an imaging device mounted thereon, the first arm imaging device being positioned to obtain images in a direction toward the second axial end of the elongate body, the second arm imaging device being positioned to obtain images in a direction toward the first axial end, the first and second arms being spaced apart from one another along a length of the elongate body at a distance sufficient to image canopy of crop growth in a field in which the field controller and sensor is deployed, the elongate body comprising at least three sensors adapted and configured to sense a like environment and crop characteristic that comprises one of temperature, humidity, $CO_2$, barometric pressure, light quantity and quality, the at least three sensors being arranged with a common spacing interval along a length of the elongate body.

21. The controller and sensor of claim 20 wherein the elongate body comprises a plurality of further sensors, the further sensors being adapted and configured to sense at least one of wind speed and direction, rainfall, soil moisture, soil temperature and nutrient composition, and root growth.

* * * * *